US010138791B2

(12) United States Patent
Meano et al.

(10) Patent No.: US 10,138,791 B2
(45) Date of Patent: Nov. 27, 2018

(54) METHOD OF CLEANING UP A PARTICULATE FILTER OF AN INTERNAL COMBUSTION ENGINE (71) Applicant: GM GLOBAL TECHNOLOGY OPERATIONS LLC, Detroit, MI (US)

(72) Inventors: Cesare Maria Meano, Turin (IT); Isadora Ricci, Turin (IT); Stefano Pellegrino, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 64 days.

(21) Appl. No.: 15/298,890

(22) Filed: Oct. 20, 2016

(65) Prior Publication Data
US 2017/0107886 A1 Apr. 20, 2017

(30) Foreign Application Priority Data

Oct. 20, 2015 (GB) .................................. 1518552.3

(51) Int. Cl.
| | |
|---|---|
| *F01N 3/00* | (2006.01) |
| *F01N 9/00* | (2006.01) |
| *F02D 41/02* | (2006.01) |
| *F02D 41/14* | (2006.01) |
| *F02D 41/00* | (2006.01) |

(Continued)

(52) U.S. Cl.
CPC ............ *F01N 9/002* (2013.01); *F01N 3/023* (2013.01); *F01N 11/007* (2013.01); *F02D 41/0007* (2013.01); *F02D 41/0055* (2013.01); *F02D 41/029* (2013.01); *F02D 41/1454* (2013.01); *F01N 2430/06* (2013.01); *F01N 2900/04* (2013.01); *F01N 2900/08* (2013.01); *F02D 41/18* (2013.01); *F02D 2200/101* (2013.01); *Y02T 10/144* (2013.01); *Y02T 10/47* (2013.01)

(58) Field of Classification Search
USPC ................... 60/274, 278, 280, 286, 295, 311
See application file for complete search history.

(56) References Cited

U.S. PATENT DOCUMENTS

| | | | |
|---|---|---|---|
| 4,615,172 A | 10/1986 | Mayer | |
| 6,851,258 B2 * | 2/2005 | Kawashima | ............ F01N 3/023 60/274 |

(Continued)

FOREIGN PATENT DOCUMENTS

| | | |
|---|---|---|
| GB | 2501923 A | 11/2013 |
| JP | 2004263578 A | 9/2004 |

OTHER PUBLICATIONS

Great Britain Patent Office, Great Britain Combined Search and Examination Report for Country Application No. 1518552.3, dated Dec. 7, 2015.

*Primary Examiner* — Binh Q Tran
(74) *Attorney, Agent, or Firm* — Lorenz & Kopf, LLP (57) ABSTRACT A method and apparatus for cleaning up a particulate filter of an internal combustion engine is provided. The internal combustion engine is operated to regenerate the particulate filter measuring. During the regeneration, a value of an engine speed is determined. A temperature of the particulate filter is controlled, if the measured value of the engine speed is smaller than or equal to a predetermined threshold value thereof. The particulate filter temperature is controlled by boosting the internal combustion engine and supplying the internal combustion engine with an amount of recirculated exhaust gases.

9 Claims, 3 Drawing Sheets (51) Int. Cl.
    *F01N 3/023*     (2006.01)
    *F01N 11/00*     (2006.01)
    *F02D 41/18*     (2006.01)

(56) References Cited

U.S. PATENT DOCUMENTS

| | | | |
|---|---|---|---|
| 8,387,370 | B2* | 3/2013 | Van Nieuwstadt ............................ F02D 41/0055 60/278 |
| 8,516,799 | B2* | 8/2013 | Hepburn ................. F01N 3/021 60/286 |
| 9,051,889 | B2* | 6/2015 | Swoish ................. F02D 41/029 |
| 2011/0099997 | A1 | 5/2011 | Singh et al. |
| 2011/0146269 | A1 | 6/2011 | Hepburn et al. |
| 2014/0116247 | A1* | 5/2014 | Nakazato ............ F02D 41/0245 95/20 |

* cited by examiner

METHOD OF CLEANING UP A PARTICULATE FILTER OF AN INTERNAL COMBUSTION ENGINE

CROSS-REFERENCE TO RELATED APPLICATION

This application claims priority to Great Britain Patent Application No. 1518552.3, filed Oct. 20, 2015, which is incorporated herein by reference in its entirety.

TECHNICAL FIELD

The present disclosure pertains to a method of cleaning up a particulate filter of an internal combustion engine, particularly an internal combustion engine of a motor vehicle.

BACKGROUND

It is known that a particulate filter is designed for trapping particulate matter (soot) that may be contained in the exhaust gases produced by an internal combustion engine, typically of a Diesel engine. When the amount of particulate matter accumulated inside the particulate filter exceeds a maximum allowable limit, the particulate filter needs to be cleaned up in order to restore its original efficiency. This activity, which is conventionally referred to as regeneration of the particulate filter, may be performed by operating the internal combustion engine to increase the temperature of the exhaust gases that flow through the particulate filter, so that the exhaust gases heat the particulate filter up to a temperature that causes the accumulated particulate matter to burn off.

However, during the regeneration, the temperature of the particulate filter is affected by other factors, including the heat generated by the combustion of the particulate matter and the heat evacuated by the mass flow rate of exhaust gases that flow through the particulate filter. In particular, the mass flow rate of the exhaust gases is related, among others, to the engine speed, namely to the rotational speed of the engine crankshaft, which determines the number of exhaust strokes performed per unit of time. As a consequence, if the engine speed abruptly decreases during the regeneration of the particulate filter (e.g. drops to idle speed), the cooling effect of the exhaust gases is significantly reduced and the temperature of the particulate filter may increase uncontrollably.

Accordingly, it is desirable to provide a solution for restoring the efficiency of the particulate filter when the internal combustion engine is operating at low engine speed (e.g. at idle speed), while preventing the particulate filter from being subjected to excessive thermal stress.

SUMMARY

An embodiment of the disclosure provides a method of cleaning up a particulate filter of an internal combustion engine in which the internal combustion engine is operated to regenerate the particulate filter. During the regeneration, a value of an engine speed is measured. A temperature of the particulate filter is controlled, if the measured value of the engine speed is smaller than or equal to a predetermined threshold value thereof. Controlling of the particulate filter temperature includes boosting the internal combustion engine and supplying the internal combustion engine with an amount of recirculated exhaust gases. The boosting of the internal combustion engine has the effect of increasing the mass flow rate of exhaust gases that flow through the particulate filter, thereby guaranteeing a proper cooling effect on the particulate filter even if the internal combustion engine is operating at low engine speed. On the other hand, the recirculated exhaust gases have the effect of reducing the quantity of oxygen that flows through the particulate filter, thereby reducing the heat generated by the combustion of the particulate matter. In this way, the regeneration of the particulate filter may be carried out without causing excessive thermal stress.

According to an aspect of this embodiment, the boosting of the internal combustion engine may include measuring a value of a mass flow rate of an intake air delivered to the internal combustion engine, calculating a difference between the measured value of the mass flow rate and a target value thereof, and adjusting the boost of the internal combustion engine as a function of the calculated difference. This aspect provides a precise adjustment of the engine boost by controlling the air mass flow rate in a close-loop control.

According to another aspect of this embodiment, the supplying of the internal combustion engine may include measuring a value of an oxygen concentration in the exhaust gases, calculating a difference between the measured value of the oxygen concentration and a target value thereof, and adjusting the amount of recirculated exhaust gases as a function of the calculated difference. This aspect provides a precise adjustment of the amount of recirculated exhaust gases by controlling the oxygen concentration in a close-loop control.

According to another aspect of this embodiment, the supplying of the internal combustion engine may include deriving the amount of recirculated exhaust gases from downstream of the particulate filter. This aspect is motivated by the fact that, in order to perform the regeneration, the operation of the internal combustion engine may cause small fuel quantities (usually referred to as post injections) to exit unburnt from the combustion chambers and oxidize in the exhaust pipe upstream of the particulate filter. As a consequence, the above-mentioned aspect has the effect of preventing these small quantities of unburned fuel from being recirculated together with the exhaust gases.

According to another aspect of this embodiment, the supplying of the internal combustion engine may include opening an exhaust gas recirculation valve which is in fluid communication with an exhaust pipe and with an intake duct of the internal combustion engine. This aspect provides a simple and reliable solution for recirculating the amount of exhaust gases.

According to another aspect of this embodiment, the boosting of the internal combustion engine may include operating an electric compressor disposed in an intake duct of the internal combustion engine. This aspect has the effect of making the boosting of the engine independent from the engine operating conditions.

According to another aspect of this embodiment, the method may further include calculating, during the regeneration, a variation rate of an engine speed over time, and controlling the particulate filter temperature, if the calculated variation rate is smaller than or equal to a negative threshold value thereof. This aspect has the effect of anticipating the controlling of the particulate filter temperature, in case that the engine speed is decreasing so fast that it is expected to fall quickly below the threshold value.

The present solution may be also embodied in the form of a computer program including a computer-code for performing, when run on a computer, the method described above, or in the form of a computer program product including a carrier on which the computer program is stored. In particular, the present disclosure may be embodied in the form of a control apparatus for a particulate filter of an internal combustion engine, including an electronic control unit, a data carrier associated to the electronic control unit and the computer program stored in the data carrier. Another embodiment may provide an electromagnetic signal modulated to carry a sequence of data bits which represent the computer program.

Another embodiment of the present disclosure provides an internal combustion engine including a particulate filter and an electronic control unit configured to operate the internal combustion engine to regenerate the particulate filter, measure, during the regeneration, a value of an engine speed, and control a temperature of the particulate filter, if the measured value of the engine speed is smaller than or equal to a predetermined threshold value thereof. In order to control the particulate filter temperature, the electronic control unit is further configured to boost the internal combustion engine, and supply the internal combustion engine with an amount of recirculated exhaust gases. This embodiment achieves basically the same effect of the method above, in particular that of allowing to carry out the regeneration of the particulate filter at low engine speed without causing excessive thermal stress.

According to an aspect of this embodiment, in order to boost the internal combustion engine, the electronic control unit may be configured to measure a value of a mass flow rate of an intake air delivered to the internal combustion engine, calculate a difference between the measured value of the mass flow rate and a target value thereof, and adjust the boost of the internal combustion engine as a function of the calculated difference. This aspect provides a precise adjustment of the engine boost by controlling the air mass flow rate in a close-loop control.

According to another aspect of this embodiment, in order to supply the internal combustion engine, the electronic control unit may be configured to measure a value of an oxygen concentration in the exhaust gases, calculate a difference between the measured value of the oxygen concentration and a target value thereof, and adjust the amount of recirculated exhaust gases as a function of the calculated difference. This aspect provides a precise adjustment of the amount of recirculated exhaust gases by controlling the oxygen concentration in a close-loop control.

According to another aspect of this embodiment, in order to supply the internal combustion engine, the electronic control unit may be configured to derive the amount of recirculated exhaust gases from downstream of the particulate filter. This aspect has the effect of preventing post-injections from being recirculated together with the exhaust gases.

According to another aspect of this embodiment, in order to supply the internal combustion engine, the electronic control unit may be configured to open an exhaust gas recirculation valve which is in fluid communication with an exhaust pipe and with an intake duct of the internal combustion engine. This aspect provides a simple and reliable solution for recirculating the amount of exhaust gases.

According to another aspect of this embodiment, in order to boost the internal combustion engine, the electronic control unit may be configured to operate an electric compressor disposed in an intake duct of the internal combustion engine. This aspect has the effect of making the boosting of the engine independent from the engine operating conditions.

According to another aspect of this embodiment, the electronic control unit may be configured to calculate, during the regeneration, a variation rate of an engine speed over time, and control the particulate filter temperature, if the calculated variation rate is smaller than or equal to a negative threshold value thereof. This aspect has the effect of anticipating the controlling of the particulate filter temperature, in case that the engine speed is decreasing so fast that it is expected to fall quickly below the threshold value.

Still another embodiment of the disclosure provides an apparatus for cleaning up a particulate filter of an internal combustion engine. The apparatus is configured to operate the internal combustion engine to regenerate the particulate filter, measure, during the regeneration, a value of an engine speed, and control a temperature of the particulate filter, if the measured value of the engine speed is smaller than or equal to a predetermined threshold value thereof. The apparatus is configured to control the particulate filter temperature by boosting the internal combustion engine, and supplying the internal combustion engine with an amount of recirculated exhaust gases. This embodiment achieves basically the same effect of the method above, in particular that of allowing to carry out the regeneration of the particulate filter at low engine speed without causing excessive thermal stress.

According to an aspect of this embodiment, the apparatus is configured to boost the internal combustion engine by measuring a value of a mass flow rate of an intake air delivered to the internal combustion engine, calculating a difference between the measured value of the mass flow rate and a target value thereof, and adjusting the boost of the internal combustion engine as a function of the calculated difference. This aspect provides a precise adjustment of the engine boost by controlling the air mass flow rate in a close-loop control.

According to another aspect of this embodiment, the apparatus is configured to supply recirculated exhaust gas to the internal combustion engine by measuring a value of an oxygen concentration in the exhaust gases, calculating a difference between the measured value of the oxygen concentration and a target value thereof, and adjusting the amount of recirculated exhaust gases as a function of the calculated difference. This aspect provides a precise adjustment of the amount of recirculated exhaust gases by controlling the oxygen concentration in a close-loop control.

According to another aspect of this embodiment, the apparatus is configured to supply recirculated exhaust gas to the internal combustion engine by deriving the amount of recirculated exhaust gases from downstream of the particulate filter. This aspect has the effect of preventing post-injections from being recirculated together with the exhaust gases.

According to another aspect of this embodiment, the apparatus is configured to supply recirculated exhaust gas to the internal combustion engine by opening an exhaust gas recirculation valve which is in fluid communication with an exhaust pipe and with an intake duct of the internal combustion engine. This aspect provides a simple and reliable solution for recirculating the amount of exhaust gases.

According to another aspect of this embodiment, the apparatus is configured to boost the internal combustion engine by operating an electric compressor disposed in an intake duct of the internal combustion engine. This aspect has the effect of making the boosting of the engine independent from the engine operating conditions.

According to another aspect of this embodiment, the apparatus is further configured to calculate, during the regeneration, a variation rate of an engine speed over time, and control the particulate filter temperature, if the calculated variation rate is smaller than or equal to a negative threshold value thereof. This aspect has the effect of anticipating the controlling of the particulate filter temperature, in case that the engine speed is decreasing so fast that it is expected to fall quickly below the threshold value.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
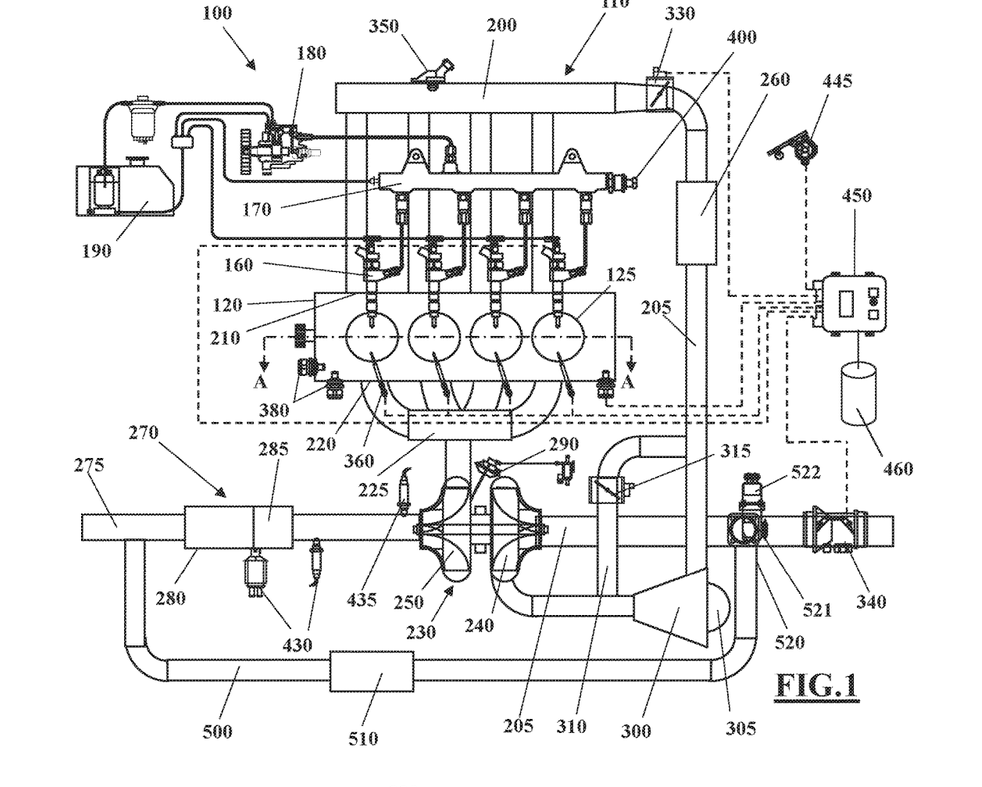
FIG. 1 illustrates an automotive system according to an embodiment of the present disclosure.
Figure 2:
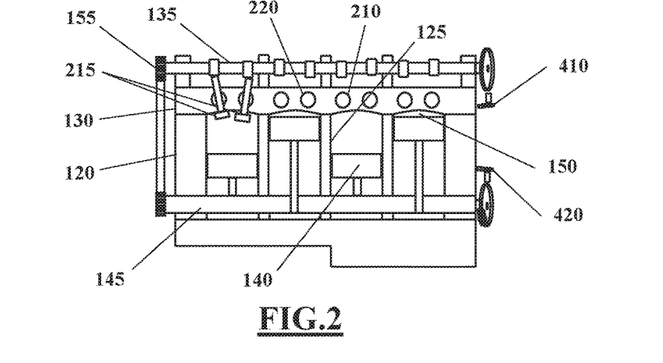
FIG. 2 is a schematic section A-A of an internal combustion engine belonging to the automotive system of FIG. 1.

Some embodiments may include an automotive system 100, as shown in FIGS. 1 and 2, that includes an internal combustion engine (ICE) 110, for example a compression-ignition engine (e.g. Diesel) or a spark-ignition engine (e.g. gasoline). The ICE 110 has an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gases causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through an exhaust port 220. In some examples; a cam phaser 155 may selectively vary the timing between the camshaft 135 and the crankshaft 145.

The air may be provided to the air intake port(s) 210 through an intake manifold 200 in communication with the air intake port(s) 210. An air intake duct 205 may provide air from the ambient environment to the intake manifold 200. An intake valve 330 may be disposed in the intake duct 205.

The exhaust gases are directed into an exhaust system 270. The exhaust system 270 may include an exhaust manifold 225 in fluid communication with the exhaust port(s) 220, which collects the exhaust gases and directs them into and exhaust pipe 275 having one or more exhaust aftertreatment devices. The aftertreatment devices may be any device configured to change the composition of the exhaust gases. In particular, the aftertreatment devices may include a particulate filter 280 disposed in the exhaust pipe 275 to trap and accumulate the particulate matter (soot) contained in the exhaust gas. An oxidation catalyst 285 may be also disposed in the exhaust pipe 275 upstream of the particulate filter 280, to oxidize the hydrocarbons and carbon monoxide. In some embodiments, the aftertreatment devices may further include, but are not limited to, catalytic converters (two and three ways), lean NOx traps, hydrocarbon adsorbers and selective catalytic reduction (SCR) systems.

The automotive system 100 may also include a turbocharger 230, having a compressor 240 rotationally coupled to a turbine 250, wherein the compressor is located in the intake duct 205 and the turbine in the exhaust pipe 275. Rotation of the compressor 240 increases the pressure and temperature of the air in the intake duct 205 and manifold 200. The turbine 250 rotates by receiving exhaust gases from the exhaust manifold 225 that directs exhaust gases from the exhaust ports 220 and through a series of vanes prior to expansion through the turbine 250. This example shows a variable geometry turbine (VGT) with a VGT actuator 290 arranged to move the vanes of the turbine 250 to alter the flow of the exhaust gases through it. An intercooler 260, disposed in the intake duct 205 between the compressor 240 and the intake manifold 200, may reduce the temperature of the air.

The automotive system 100 may further include an exhaust gas recirculation (EGR) system for recirculating part of the exhaust gases generated by the ICE 110 back into the combustion chambers 150. The EGR system may include a low-pressure EGR (LP-EGR) pipe 500 coupled between the exhaust manifold 225 and the intake manifold 200. More specifically, the LP-EGR pipe 500 branches from a point of the exhaust pipe 275 located downstream of the turbine 250, particularly downstream of the particulate filter 280, and leads in a point of the intake duct 205 located upstream of the compressor 240. The LP-EGR pipe 500 may be provided with a LP-EGR cooler 510 to reduce the temperature of the exhaust gases flowing therein. A LP-EGR valve 520 may be disposed in the LP-EGR pipe 500. The LP-EGR valve 520 may include a movable valve member 521 and an electrical actuator 522 that moves the valve member 521 to regulate a mass flow rate of the exhaust gases in the LP-EGR pipe 500. In particular, the electrical actuator 522 may be controlled with a PWM signal, so that the position of the valve member 521 and thus the amount of recirculated exhaust gas is proportional to the duty cycle of the PWM signal.

The automotive system 100 may also include an auxiliary compressor 300 located in the intake duct 205 between the compressor 240 of the turbocharger 230 and the intercooler 260 to increase the pressure and temperature of the air in the intake duct 205 and manifold 200, independently from the action of the turbocharger 230. The auxiliary compressor 300 may be an electric compressor (e-compressor). In other words, the compressor 300 may be actuated by an electric motor 305. The electric motor 305 may be controlled by means of a PWM (Pulse Width Modulation) signal, so that the rotational speed of the electric motor 305, the rotational speed of the auxiliary compressor 300 and thus the boost generated by the auxiliary compressor 300 (i.e. the amount by which the induction pressure is increased by the compressor 300), are all proportional to the duty cycle of such PWM signal. A by-pass duct 310 may be provided for fluidly connecting a first portion of the intake duct 205, which is located between the compressor 240 and the compressor 300, to a second portion of the intake duct 205, which is located between the compressor 300 and the intercooler 260. A by-pass valve 315 may be disposed in the by-pass duct 310.

In other embodiments, the auxiliary compressor 300 may be located in the intake duct 205 between the leading point of the LP-EGR pipe 500 and the compressor 240 of the turbocharger 230. In this cases, the by-pass duct 310 may be provided for fluidly connecting a first portion of the intake duct 205, which is located between the leading point of the LP-EGR pipe 500 and the compressor 300, to a second portion of the intake duct 205, which is located between the compressor 300 and the compressor 240.

More generally, the auxiliary compressor 300 may be located in any point of the intake duct 205 between the leading point of the LP-EGR pipe 500 and the intake manifold 200 and the by-pass valve 315 may be positioned accordingly.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340 located in the intake duct 205 upstream of the LP-EGR valve 520, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, a lambda sensor 435 for sensing an oxygen concentration in the exhaust gases, and an accelerator pedal position sensor 445. Furthermore, the ECU 450 may generate output signals to various control devices that are arranged to control the operation of the ICE 110, including, but not limited to, the fuel injectors 160, the intake valve actuator 332, the HP-EGR Valve actuator 322, the LP-EGR valve actuator 522, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carry out the steps of such methods and control the ICE 110.

The program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible computer-readable storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an on-board computer, or any processing module that might be deployed in the vehicle.

The ECU 450 is generally configured to control the operation of the ICE 110 by determining, on the basis of the signal coming from the accelerator pedal position sensor 445, a quantity of fuel to be injected into each combustion chamber 150 per engine cycle and then by commanding the corresponding fuel injector 160 to perform accordingly. In particular, the fuel injector 160 may be commanded to inject the prescribed fuel quantity by performing, during each engine cycle, a plurality of separated fuel injections, according to a so-called multi-injection pattern.

While the ICE 110 is operating, the particulate matter (soot) produced by the combustion of the fuel injected quantities is evacuated with the exhaust gases and is progressively trapped and accumulated in the particulate filter 280. When the amount of particulate matter accumulated in the particulate filter 280 exceeds a maximum allowable level, the ECU 450 may be configured to clean up the particulate filter 280 in order to restore its original efficiency.

Figure 3:
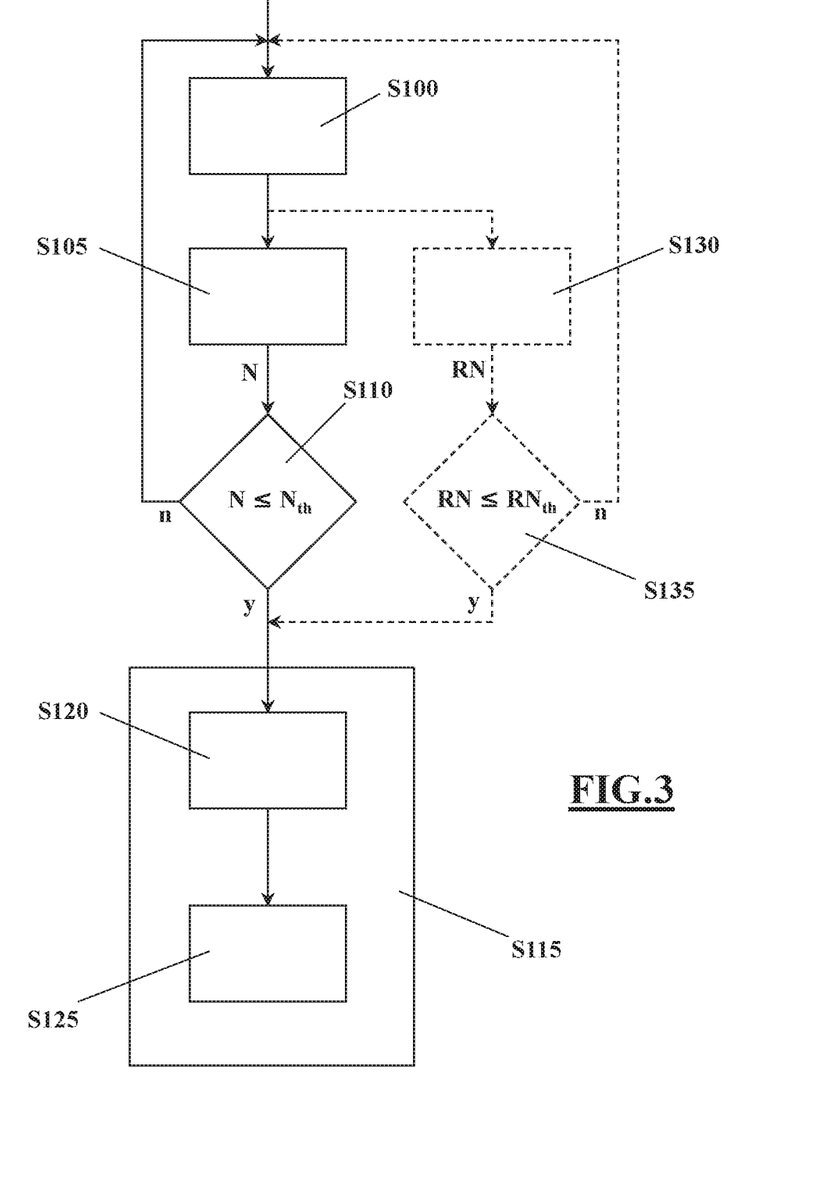
FIG. 3 is a flowchart illustrating a method of cleaning up a particulate filter of the automotive system of FIG. 1.

To clean up the particulate filter 280, the ECU 450 may execute the procedure illustrated in the flowchart of FIG. 3. As a first step, the ECU 450 may be configured to regenerate the particulate filter 280 (block S100). The regeneration of the particulate filter 280 may be obtained by operating the ICE 110 in such a way to increase the temperature of the exhaust gases that flow through the particulate filter 280, so that these hot exhaust gases can heat the particulate filter up to a temperature that causes the accumulated particulate matter to burn off. To increase the temperature of the exhaust gases, the ECU 450 may be particularly configured to command the fuel injectors 160 to perform, during each engine cycle, one or more late-injections. The late-injections are small quantities of fuel that are injected into a combustion chamber 150 during the expansion stroke of the correspondent piston 140. In particular, the late-injections may include one or more after-injections, which are performed before the opening of the exhaust port 220, and/or one or more post-injections, which are performed after the opening of the exhaust port 220. The fuel quantities injected by the after-injections generally burn inside the combustion chamber 150 but have a negligible impact on the engine torque, so that their main effect is that of increasing the temperature of the exhaust gases. On the other hand, the fuel quantities injected by the post-injections exit unburnt from the combustion chamber 150 and oxidize in the oxidation catalyst 285, thereby heating the exhaust gases before they flow through the particulate filter 280.

Once the regeneration has been started, the temperature of the particulate filter 280 is also affected by other important factors, including the heat generated by the combustion of the particulate matter and the heat evacuated by exhaust gases that exit the particulate filter 281. In this regard, the heat generated by the combustion of the particulate matter strongly depends on the oxygen content of the exhaust gases that flow through the particulate filter 280, whereas the heat evacuated by the exhaust gases strongly depends on their mass flow rate, which in turn depends, among others, on the engine speed, namely on the angular speed of the crankshaft 145, which determines the number of exhaust strokes performed per unit of time.

As a consequence, if the engine speed decreases too much, the mass flow rate of the exhaust gases generally decreases proportionally and the temperature of the particulate filter 280 may rise uncontrollably.

To keep the temperature of the particulate filter 280 under control, the ECU 450 may be configured to measure, during the regeneration, a value N of the engine speed (block S105) and to compare this measured value N with a predetermined lower threshold value $N_{th}$ of the engine speed (block S110). In general terms, the threshold value $N_{th}$ is a value of the engine speed below which the loss of cooling effect from the exhaust gases becomes critical. This threshold value $N_{th}$ may be a calibration parameter determined by means of an experimental activity on a test bench. In some embodiments, the threshold value $N_{th}$ may coincide with the idle speed that is the rotational speed that the crankshaft 145 runs on when the ICE is uncoupled to the drivetrain and the accelerator pedal is completely released.

As long as the measured value N of the engine speed is larger than the threshold value $N_{th}$, the ECU 450 may continue to operate the regeneration of the particulate filter 280 normally.

If conversely the measured value N of the engine speed gets equal to or smaller than the threshold value $N_{th}$ (e.g. drops to idle speed), the ECU 450 may be configured to control the temperature of the particulate filter 280 (block SI 15).

The controlling of the particulate filter temperature may provide for the ECU 450 to boost the ICE 110 (block S120), namely to increase the induction pressure of the ICE 110 above that of the ambient pressure. Since the momentum of the exhaust gases at low engine speed is insufficient to activate the turbocharger 230, the ICE 110 may be boosted in this phase by commanding the electric motor 305 to rotate the auxiliary compressor 300. The boost generated by the auxiliary compressor 300 has the effect of increasing the mass flow rate of the intake air delivered into the combustion chambers 150 and consequently also the mass flow rate of exhaust gases that flow through the particulate filter 280, thereby compensating for the low engine speed.

Figure 4:
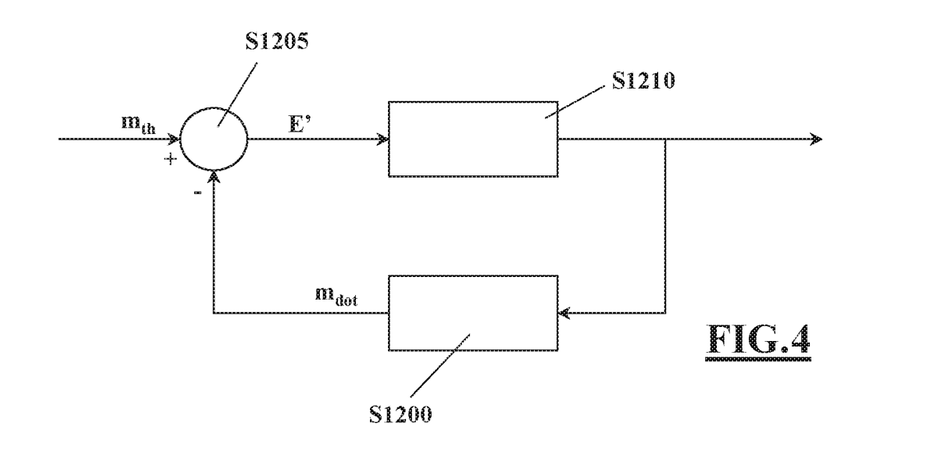
FIG. 4 is a closed loop control involved in the method of FIG. 3.

As shown in FIG. 4, the boost generated by the auxiliary compressor 300 may be adjusted in this phase by controlling the air mass flow rate in a closed loop control. In more details, the closed loop control may provide for the ECU 450 to measure a value $m_{dot}$ of the mass flow rate of the intake air delivered to the ICE 110 (block S1200), to calculate a difference E' between the measured value $m_{dot}$ of the mass flow rate and a target value $m_{th}$ thereof (block S1205), and finally to adjust the boost of the ICE 110 as a function of the calculated difference E' (block S1210). The value $m_{dot}$ of the air mass flow rate may be measured by means of the mass airflow and temperature sensor 340. The target value $m_{th}$ of the air mass flow rate may be a calibration parameter or may be determined by the ECU 450 on the basis of the current engine operating conditions. The boost of the ICE 110 may be adjusted by adjusting the duty cycle of the PWM signal that controls the electric motor 305. By way of example, the difference E' may be used as input of a controller, such as a proportional controller, a proportional-integrative controller or a proportional-integrative-derivative controller, that yields as output a corresponding value of the duty cycle of the PWM signal. In this way, if the measured value $m_{dot}$ of the air mass flow rate is smaller than the target value $m_{th}$, the duty cycle of the PWM signal is increased, thereby increasing the rotational speed of the auxiliary compressor 300 and the boost if conversely the measured value $m_{dot}$ of the air mass flow rate is larger than the target value $m_{th}$, the duty cycle of the PWM signal is decreased, thereby decreasing the rotational speed of the auxiliary compressor 300 and the boost.

Contemporaneously, the controlling of the particulate filter temperature may provide for the ECU 450 to supplying the ICE 110 with an amount of recirculated exhaust gases (block S125), for example by commanding the actuator 522 of the LP-EGR valve 520 to move the valve member 521 in an open position, namely in a position where a fluid connection exists between the exhaust pipe 275 and the intake duct 205 via the LP-EGR valve 520. The recirculation of this amount of exhaust gases has the effect of reducing the oxygen concentration in the intake air delivered into the combustion chambers 150 and consequently also the oxygen concentration in the exhaust gases that flow through the particulate filter 280, thereby reducing the heat generated in the particulate filter 280 by the combustion of the particulate matter during the regeneration.

Figure 5:
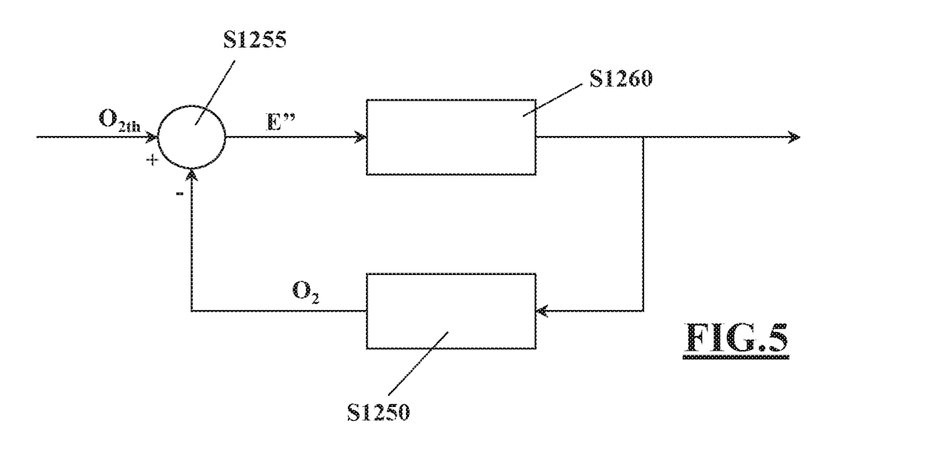
FIG. 5 is another closed loop control involved in the method of FIG. 3.

As shown in FIG. 5, the amount of recirculate exhaust gases may be adjusted in this phase by controlling the oxygen (massive) concentration in the exhaust gases in a closed-loop control. In more details, the closed loop control may provide for the ECU 450 to measure a value $O_2$ of the oxygen concentration in the exhaust gases (block S1250), calculate a difference E" between the measured value $O_2$ of the oxygen concentration and a target value $O_{2th}$ thereof (block S1255), and finally adjust the amount of recirculate exhaust gases as a function of the calculated difference E" (block S1260). The value $O_2$ of the oxygen concentration may be measured by means of the lambda sensor 435. The target value $O_{2th}$ of the oxygen concentration may be a calibration parameter or may be determined by the ECU 450 on the basis of the current engine operating conditions. In general, the target value $O_{2th}$ of the oxygen concentration should be kept to the lowest value that still allows the engine to run, for example included between 6% and 7%. The amount of recirculated exhaust gases may be adjusted by adjusting the duty cycle of the PWM signal that controls the actuator 522 of the LP-EGR valve 520. By way of example, the difference E" may be used as input of a controller, such as a proportional controller, a proportional-integrative controller or a proportional-integrative-derivative controller, that yields as output a corresponding value of the duty cycle of the PWM signal. In this way, if the measured value $O_2$ of the oxygen concentration is smaller than the target value $O_{2th}$, the duty cycle of the PWM signal is decreased, thereby decreasing the opening degree of the valve member 521 and the amount of recirculated exhaust gases if conversely the measured value $O_2$ of the oxygen concentration is larger than the target value $O_{2th}$, the duty cycle of the PWM signal is increased, thereby increasing the opening degree of the valve member 521 and the amount of recirculated exhaust gases.

According to some embodiments, the ECU 450 may be configured to start controlling the particulate filter temperature a little earlier than when the measured value N of the engine speed drops to the threshold value $N_{th}$ (e.g. to idle). To do so, these embodiments may provide for the ECU 450 to perform also the additional steps illustrated in dotted line in FIG. 3. In greater details, these embodiments may calculate, during the regeneration, a variation rate RN of the engine speed over time (block S130), to compare the calculated variation rate RN with a negative threshold value $RN_{th}$ thereof (block S135), and then to control the particulate filter temperature, if the calculated variation rate RN is smaller than or equal to the negative threshold value $RN_{th}$ thereof. This aspect has the effect of anticipating the activation of activities that protect the particulate filter 280 from excessive thermal stresses, in case that the engine speed is decreasing so fast that it is expected to fall quickly below the threshold value.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of cleaning up a particulate filter of an internal combustion engine comprising:
    operating the internal combustion engine to regenerate the particulate filter;
    measuring, using a sensor, a value of an engine speed during the regeneration; and
    controlling a temperature of the particulate filter, if the measured value of the engine speed is smaller than or equal to a predetermined threshold value thereof;
    wherein the controlling of the particulate filter temperature includes boosting the internal combustion engine, and supplying the internal combustion engine with an amount of recirculated exhaust gases.

2. The method according to claim 1, wherein boosting of the internal combustion engine comprises:
    measuring a value of a mass flow rate of an intake air delivered to the internal combustion engine;
    calculating a difference between the measured value of the mass flow rate and a target value thereof; and
    adjusting the boost of the internal combustion engine as a function of the calculated difference.

3. The method according to claim 1, wherein supplying of the internal combustion engine with recirculated exhaust gas comprises:
    measuring a value of an oxygen concentration in the exhaust gases;
    calculating a difference between the measured value of the oxygen concentration and a target value thereof; and
    adjusting the amount of recirculated exhaust gases as a function of the calculated difference.

4. The method according to claim 1, wherein the supplying of the internal combustion engine comprises the step of deriving the amount of recirculated exhaust gases from downstream of the particulate filter.

5. The method according to claim 1, supplying of the internal combustion engine with recirculated exhaust gas comprises opening an exhaust gas recirculation valve which is in fluid communication with an exhaust pipe and with an intake duct of the internal combustion engine.

6. The method according to claim 1, wherein boosting of the internal combustion engine comprises operating an electric compressor disposed in an intake duct of the internal combustion engine.

7. The method according to claim 1, further comprising:
    measuring a variation rate of an engine speed over time, during the regeneration; and
    controlling the particulate filter temperature, if the measured variation rate is smaller than or equal to a negative threshold value thereof.

8. A non-transitory computer-readable medium comprising a computer program having computer-code, which when run on a computer, performs a method of cleaning up a particulate filter of an internal combustion engine comprising:
    operating the internal combustion engine to regenerate the particulate filter;
    measuring a value of an engine speed during the regeneration; and
    controlling a temperature of the particulate filter, if the measured value of the engine speed is smaller than or equal to a predetermined threshold value thereof;
    wherein the controlling of the particulate filter temperature includes boosting the internal combustion engine, and supplying the internal combustion engine with an amount of recirculated exhaust gases.

9. An internal combustion engine comprising a particulate filter and an electronic control unit configured to:
    operate the internal combustion engine to regenerate the particulate filter;
    measure, using a sensor, a value of an engine speed, during the regeneration; and
    control a temperature of the particulate filter if the measured value of the engine speed is smaller than or equal to a predetermined threshold value thereof;
    wherein the electronic control unit is configured to boost, using an electric compressor disposed in an intake duct of the internal combustion engine, the internal combustion engine, and supply, using an exhaust gas recirculation valve which is in fluid communication with an exhaust pipe and with an intake duct of the internal combustion engine, the internal combustion engine with an amount of recirculated exhaust gases for controlling the particulate filter temperature.

* * * * *